United States Patent
Carter

[15] 3,687,293
[45] Aug. 29, 1972

[54] THERAPEUTIC DEVICE
[72] Inventor: Douglas Vaughan Carter, Bishampton, near Pershore, England
[73] Assignee: Avon Rubber Company Limited, Melksham, Wiltshire, England
[22] Filed: Oct. 30, 1970
[21] Appl. No.: 85,435

[30]      Foreign Application Priority Data
          Nov. 5, 1969    Great Britain..........54,275/69

[52] U.S. Cl...................................210/321, 210/494
[51] Int. Cl. ..............................................B01d 31/00
[58] Field of Search........................210/494, 321, 22

[56]               References Cited
              UNITED STATES PATENTS

| | | |
|---|---|---|
| 2,982,416 | 5/1961 | Bell............................210/321 |
| 3,508,662 | 4/1970 | Miller, III...............210/321 |
| 3,077,268 | 2/1963 | Gobel et al. ...........210/494 X |
| 3,326,380 | 6/1967 | Fenchner et al...........210/321 |
| 3,510,004 | 5/1970 | Hoeltzenbein..........210/494 X |

FOREIGN PATENTS OR APPLICATIONS 1,300,140   4/1961   France........................210/321

OTHER PUBLICATIONS

" Artificial Kidneys," a publication of Travenol Laboratories, Inc., 20 pages, Sept. 30, 1967, pages 15 & 16 relied on.

*Primary Examiner*—Frank A. Spear, Jr.
*Attorney*—Jones and Lockwood

[57]              ABSTRACT

A haemodialysis unit suitable for use in an artificial kidney machine has a blood conduit which has a wall of semi-permeable material on each of closely spaced opposite sides and plastics material sheet outside and on each side of the conduit. The sheet on each side provides, with a wall of semi-permeable material on that side, walls of a passage for dialysing liquid. On each side of the conduit the sheet has parallel liquid flow-directing ribs which are directed towards and into contact with the wall of semi-permeable material. The ribs on one side of the conduit are at an angle to the ribs on the opposite side. The blood conduit may be in the form of a tube or tubes of semi-permeable material and this may be coiled together with a length of a novel form of plastics material sheet which has ribs on both sides, the ribs on one side of the sheet being at an angle to the ribs on the other side.

6 Claims, 1 Drawing Figure

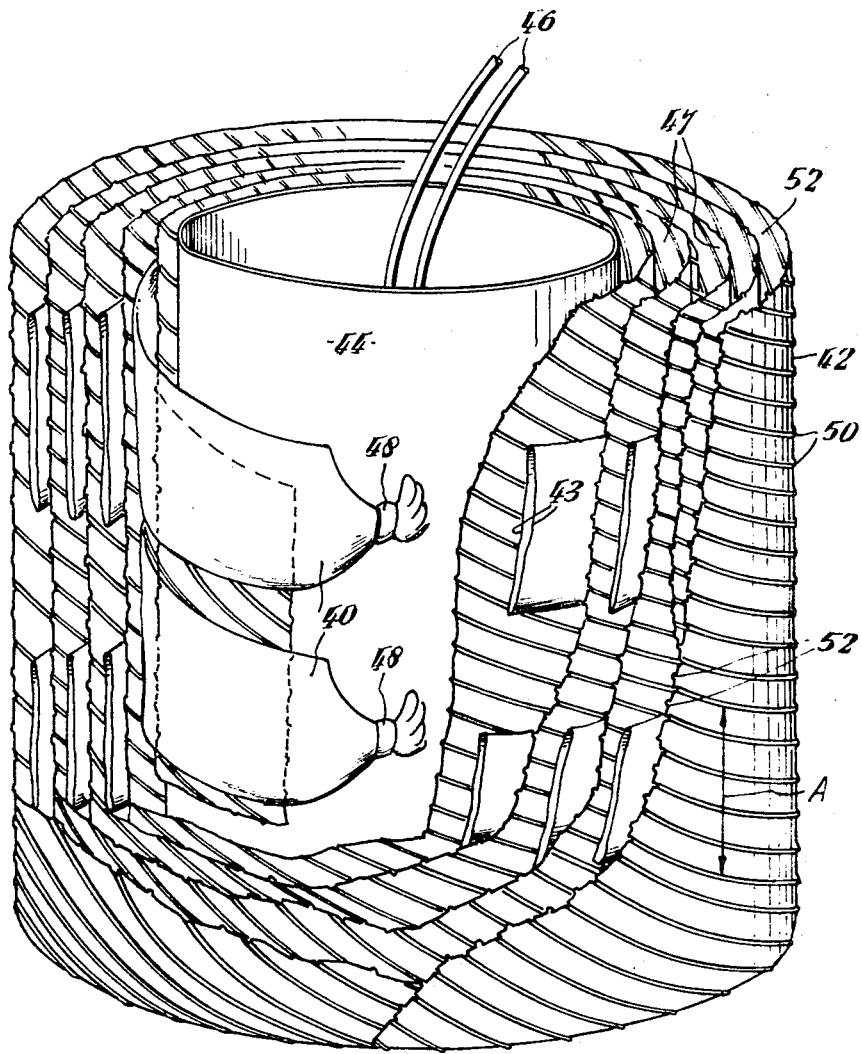

THERAPEUTIC DEVICE

This invention relates to therapeutic devices in particular to haemodialysis units suitable for use in artificial kidney machines, i.e. units in which dialysis occurs between blood and a dialysing liquid across a semi-permeable membrane; to artificial kidney machines including such haemodialysis units and to plastics material sheets which may be used in such units.

In artificial kidney machines in use hitherto, it has been the practice to pass the patient's blood through a tube formed of a semi-permeable material and at the same time to pass over the outer surface of the tube a dialysing liquid. By this means, impurities could pass by the process of dialysis from the blood into the dialysing liquid, leaving the blood in a purified condition for return to the patient. In one haemodialysis unit, woven glass fiber mesh was used to pack the space in the vessel around the tube, the dialysing liquid filtering through the glass fiber.

Disadvantages of prior arrangements have been that full use has not been made of the dialysing liquid by bringing it into contact with the wall of the tube, and support materials surrounding the tube have caused damage to the semi-permeable material of the tube.

According to this invention there is provided a haemodialysis unit suitable for use in an artificial kidney machine including a blood conduit having on each of closely spaced opposite sides a wall of semi-permeable material and, outside and on each side of the conduit, plastics material sheet providing, with the wall of semi-permeable material on that side, walls of a passage for dialysing liquid, the plastics material sheet having substantially parallel liquid flow-directing ribs directed towards and in contact with the wall of semi-permeable material, the ribs on one side of the conduit being at an angle to the ribs on the opposite side of the conduit. The blood conduit may be in the form of one or more tubes of semi-permeable material coiled together with a length of plastics material sheet, each turn of the coil of each tube being separated from the adjacent turn or turns of the tube by a turn of the coil of the plastics material sheet, the plastics material sheet having parallel liquid flow directing ribs on both sides, the ribs on one side of the sheet being at an angle to the ribs on the other side. The haemodialysis unit may be provided with an inflatable collar to surround the periphery of the coil and seal the space between the coil and the walls of a container into which dialysing liquid can be passed.

The invention further provides an artificial kidney machine including a haemodialysis unit as above described.

According to another aspect of the invention there is provided a plastics material sheet having on each surface a plurality of substantially parallel ribs, the ribs on one side being at an angle to the ribs on the other side. The sheet may be formed by extruding or calendaring plastics material and then forming the ribs by means of profiling rollers.

One form of this invention will be described with reference to the accompanying drawing which show in perspective view, partly broken away and sectioned, a haemodialysis unit (hereinafter called "the coil assembly") of an artificial kidney machine.

In the drawing, the coil assembly comprises a pair of tubes 40 forming conduits for blood coiled together with a length of ribbed plastics material sheet 42 about a central cylindrical former 44. The tubes 40 are each made of regenerated cellulose lay-flat tubing and afford a large area for dialysis between the blood and a dialysing liquid. Cellophane or Cuprophane lay-flat tubing can be used for the tubes 40. The side walls 43 of the tubes are closely spaced or, at some points, in contact. Inlet tubes leading to the inner ends of the tube coils are shown at 46. They pass through the wall of the cylindrical former 44 and are held within the tubes 40 by the fastening bands 48. Outlet tubes (not shown) are provided at the outer ends of the tube coils. In the form illustrated the blood is pumped through the tubes by means of a pump but by a different choice, e.g. of rib dimensions and spacing, arterial pressure may suffice.

In use, the coil assembly is placed in an outer vessel (not shown) which may for instance be a container made of a transparent plastics material such as polyvinylchloride. In one form the space between the periphery of the coil assembly and the outer vessel is filled by an inflatable collar or muff of annular cross section which is placed around the periphery of the coil assembly when uninflated. On inflation the collar expands to press against the interior wall of the outer vessel and against the outer layer of the coiled plastics sheet, applying an even and easily controlled pressure to the coil assembly which prevents or restricts expansion or uncoiling of the assembly when blood and dialysing liquid are applied to it.

Dialysing liquid under appropriate pressure is fed to the vessel by means either of a feed from a storage tank disposed to give a pressure head or by means of a pump. The supply means for the dialysing liquid is not shown. The dialysing liquid flows upwards through spaces 47 between successive turns of the coil of the sheet 42 and, on reaching the lower edges of each of the coiled tubes 40, through passages formed between the sheet 42 and the outward facing surfaces of the walls of the tubes 40, being guided by ribs 50,52 of the sheet subsequently described. The cylindrical former 44 is closed at the bottom so that the dialysing liquid only passes up through the spaces left between the former 44 and the collar. There is an outflow of used dialysing liquid to waste or for recirculation. If the dialysing solution is recirculated, there will usually be continuous partial replacement and flow to waste.

The top of the former 44 is open as shown to admit the inlet tubes 46.

The plastics sheet 42 forming an embodiment of the invention is made of polyethylene by calendaring and subsequent profiling or by extruding and subsequent profiling, the sheet having on each surface a set of parallel equidistant ribs formed by rollers during the profiling of the sheet, the ribs having the same spacing and being of equal cross-sectional size on each surface. Ribs 50 on one surface are set at an angle to the ribs 52 on the other surface. The ribs on both sides are straight in the flat condition of the sheet. Preferably, as here, the ribs in each set are at equal angles to the transverse axis A of the sheet, the ribs on one surface being inclined towards the axis from one side and the ribs on the other surface being inclined from the other side. The ribs are therefore at any one point in the coil assembly at an equal angle to the axis of the blood conduit at that point (i.e. the line midway between the edges of the lay-flat tubing).

In the coil assembly shown, the ribs 50, 52 are at an angle of about 30° to the axis of the blood conduit and generally an angle of less than 45° is advantageous. By this means the paths taken by the dialysing liquid across the surfaces of the blood conduits 40 (being parallel to the ribs) are longer than they would be if the ribs were set transversely to the blood conduits.

The blood conduits are thus located in a passage for the dialysing liquid of which the opposed walls are parallel or substantially parallel, the ribs on one wall being at an angle to the ribs on the opposed wall. During use, the ribs contact the walls of the blood conduit, outward pressure due to the blood being balanced by the pressure of the inflated collar. The blood, under slight pressure in the conduit, causes the membrane walls of the conduit to press on both sides against the ribs of the sheet. The opposed walls of the plastic sheet forming the passage containing the blood conduit are at such distance that, at the points where a rib on one wall crosses a rib on the other wall, the internal walls of the blood conduit are held in contact. The inside of the blood conduit is therefore labyrinthine in form, there being regularly spaced points where the walls are in contact and, connecting these points, ridges in the conduit wall corresponding to the ribs pressing against the outside of the conduit.

Blood passing along the conduit has to take a highly complex zig-zag path, there being no direct axial paths. There is thus ensured good and continuous mixing of the blood and thereby an even and thorough contact of all blood passing through the unit with the semi-permeable walls of the conduit. This assists in good interchange of dissolved substances between the blood and the dialysing liquid. As mentioned above, the liquid flow-directing ribs 50,52 also create extended paths for the dialysing liquid in contact with the walls of the tubes 40 which helps to make efficient use of the liquid.

The pressure applied to the coil assembly by the surrounding inflated collar should be controlled in dependence on the pressure of the blood in the blood conduit to oppose the tendency for the pressure of blood to expand the conduit and so reduce the complexity of the internal shape of the blood conduit. It is sometimes advantageous to use a relatively high pressure for the blood in the conduit as this increases the speed and efficiency of ultra-filtration of water across the membrane from the blood into the dialysing liquid. The arrangement described allows this.

It would however, be possible in alternative arrangements to achieve sufficient turbulence in the blood by allowing a small space to be left between the membrane walls at their closest points of approach.

The coil assembly illustrated can be of a suitable size to fit standard equipment. The two coils 40 can in an alternative form be replaced by a single tube for the blood of equivalent width or, if desired, of greater than equivalent width which would allow a reduction in height of the coil and would give an increase in dialysing surface area, thereby allowing a reduction in the length of blood conduit and plastics sheet. Only single inlet and outlet tubes would be needed.

An advantage of the coil assembly shown is that it can be easily lifted from the outer vessel containing it and replaced by a fresh assembly. It is made of easily disposable material.

An advantage of the use of polyethylene sheet in the above example is that the sheet can be made from inexpensive raw materials and can be made by the relatively inexpensive processes of calendaring and profiling or extruding and profiling. The polyethylene sheet is relatively supple and can be made without sharp edges which is an advantage when being used in contact with semi-permeable membranes made of Cellophane or the like. It is also dimensionally stable in the sense of being resistant to stretching in any direction. This means that spacings for blood and dialysing liquid flow are maintained after assembly and that there is little possibility for the pressure of the blood in the conduit to cause distortion of the sheet. The fact that it has a continuous web with ribs on both sides means that liquid entering between the sheet and the membrane is maintained in contact with the membrane and is directed along the desired paths and is efficiently used.

I claim:

1. A haemodialysis unit suitable for use in an artificial kidney machine including:
    at least one flexible tube of semi-permeable material forming a blood conduit;
    means connected to each end of said tube for leading blood into and away from inside of said tube;
    a length of plastics material sheet having a continuous web and liquid flow-directing ribs projecting from both sides of the web, the ribs on one side of the web being parallel to each other and at an angle to the ribs on the other side of the web, the ribs on both sides being at an angle to the longitudinal direction of the said plastics material sheet, this latter mentioned angle being less than 45°;
    a former;
    and securing means for the unit;
    said tube and said plastics material sheet being coiled together spirally around said former and secured thereto by the securing means such that a turn of said plastics material sheet separates each pair of adjacent turns of said tube, and such that said tube has a substantially flat configuration with the two closely space side walls thereof engaging the ribs on both sides of said tube, whereby a plurality of narrow channels for dialysing fluid are formed between each respective side wall and adjacent web of the sheet, each channel extending continuously from edge to edge of the tube.

2. A haemodialysis unit according to claim 1 wherein said plastics material sheet is formed by extruding the plastics material and subsequently forming the ribs by means of profiling rollers.

3. A haemodialysis unit according to claim 1 wherein said plastics material sheet is formed by calendaring the plastics material and subsequently forming the ribs by means of profiling rollers.

4. A haemodialysis unit according to claim 1 wherein the height of projection of the ribs above the web is relatively small in comparison with the spacing of adjacent ribs.

5. A haemodialysis unit according to claim 4 wherein said plastics material sheet is formed by extruding the plastics material and subsequently forming the ribs by means of profiling rollers.

6. A haemodialysis unit according to claim 4 wherein said plastics material sheet is formed by calendaring the plastics material and subsequently forming the ribs by means of profiling rollers.

* * * * *